Nov. 25, 1952     H. N. GORRIAS     2,618,881
FISHHOOK
Filed Oct. 29, 1951
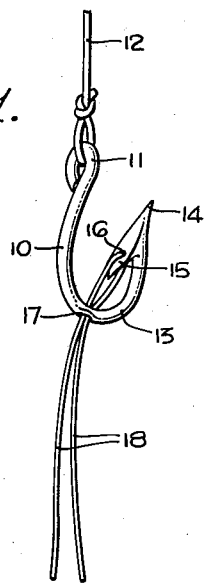
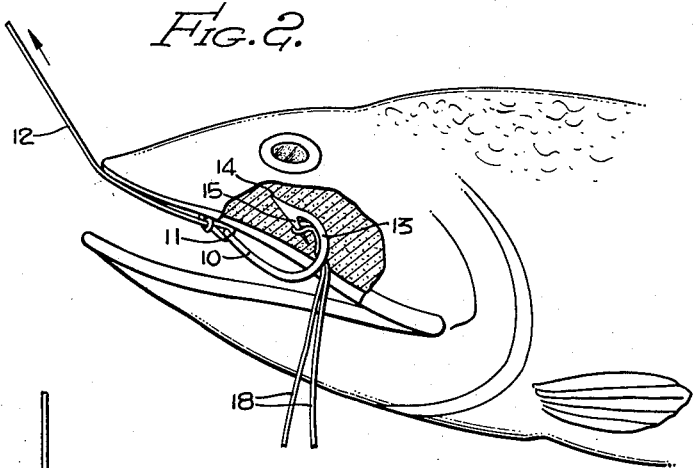
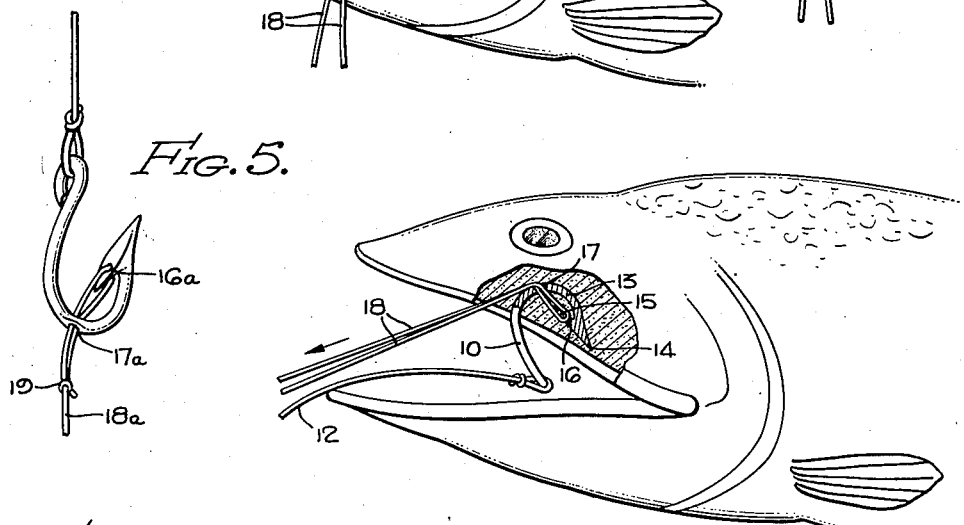
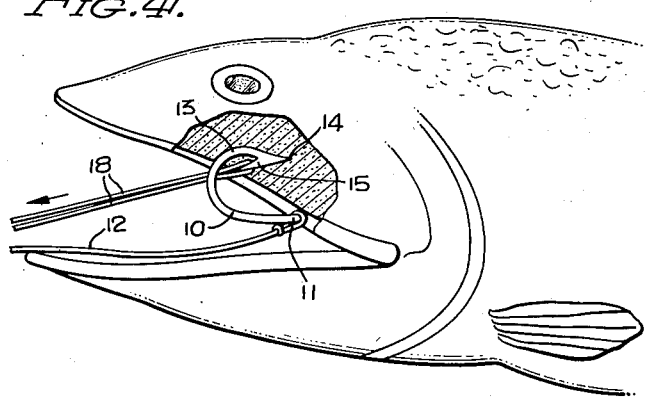
HARRY NICK GORRIAS,
INVENTOR.
BY Hazard & Miller
ATTORNEYS Patented Nov. 25, 1952

2,618,881

UNITED STATES PATENT OFFICE 2,618,881

FISHHOOK

Harry Nick Gorrias, Los Angeles, Calif.

Application October 29, 1951, Serial No. 253,601

4 Claims. (Cl. 43—43.16)

This invention relates to improvements in fishhooks and may be considered as an improvement over the disclosure made in U. S. Letters Patent No. 1,333,148, issued March 9, 1920, to A. A. Anderson.

The conventional fishhook has a shank provided with means for its attachment to a leader and the end of the bent or crotch portion of the hook is pointed and equipped with a reversely directed barb so that when a fish is hooked thereby the barb resists removal of the pointed end. The barb, however, while it functions to retain the hook in the fish while the fish is being played, is objectionable when the fish has been caught and it is then desired to remove the hook from the fish.

Prior art structure contemplates a fishhook equipped with a wire that is trained along the length of the shank and which is connected to the barb. Such wire is so bent and possesses sufficient resiliency that it normally retains a position away from the point of the barb exposing the barb to perform its normal function when the fish is hooked. When it is desired to remove the hook from the fish the wire is pulled along the length of the shank and that portion which is adjacent the barb assumes a bridging position between the barb and the crotch of the hook, thus rendering the barb ineffective when it is desired to withdraw the hook from the fish.

Several objections exist with relation to prior art structure one of which concerns the expense involved in its manufacture. Another objection exists in the danger of the wire acquiring a definite set when pulled into its bridging position so that it will not fully return to its normal position to expose the barb. Exposure of the barb in subsequent fishing is, of course, highly important if not absolutely essential. A third objection resides in the fact that in order to operate a prior art hook properly the shank of the hook must be held in one hand while the wire is being pulled by the other and a third hand is normally needed to hold the active fish.

A primary object of the present invention is to provide an improved fishhook which overcomes these objections in that the cost of manufacture can be greatly reduced; there is no danger of the bridging device acquiring a permanent set, and when it is desired to remove the hook from the fish, removal of the hook may be completely accomplished by merely pulling on the end of the bridging device. When the bridging device is pulled upon it renders ineffective the barb so that the barb no longer resists retraction of the pointed end of the hook and also brings about a removal of the hook bodily from the fish.

With the foregoing and other objects in view, which will be made manifest in the following detailed description and specifically pointed out in the appended claims, reference is had to the accompanying drawings for an illustrative embodiment of the invention, wherein:

Figure 1 is a perspective view of a hook embodying the present invention;

Fig. 2 is a view illustrating the position assumed by the parts of the hook in the act of hooking a fish;

Fig. 3 is a view similar to Fig. 2 but illustrating the position assumed by the parts in starting to remove the hook from the fish;

Fig. 4 is a similar view illustrating the hook as having been substantially removed from the fish; and Fig. 5 is a perspective view of an alternative form of construction.

Referring to the accompanying drawings wherein similar reference characters designate similar parts throughout, the improved hook consists of a shank 10 preferably formed at its upper end with an eye 11 or the equivalent, enabling the hook to be attached to the end of a leader 12. In conformity with conventional construction the shank is bent to provide a crotch 13 and has its end pointed as at 14. Near the point 14 the hook is equipped with a rearwardly directed barb 15. This barb is preferably but not necessarily widened and flattened so that a small eye or aperture 16 can be conveniently formed therein. A similar eye or aperture 17 is formed in the bend of the hook at a location that is in alignment with the direction of the barb 15. A bridging element 18 is extended through the eye or aperture 16 so as to be looped through the barb and both ends thereof are extended through the aperture 17. This bridging element, instead of being formed of wire possessing some resiliency or which is capable of retaining a definite set, is formed of a highly limp material such as thread or fine string. The free ends of the bridging member 18, instead of being trained or guided along the shank of the hook, are allowed to merely dangle freely from the aperture 17.

Bait may be applied to the hook in the conventional manner and the presence of the bridging element 18 does not interfere with the application of the bait. Normally the presence of the dangling ends adjacent the bait does not ward off or scare off the fish from the hook. When the fish is hooked, as indicated in Fig. 2, the pointed end of the hook will enter the flesh of the fish and a portion of the flesh is caused to pass over the barb 15. This flesh, in tending to return to its normal position or to contract about the hook, merely presses the limp bridging element 18 against the bend of the hook, as depicted in Fig. 2. In the usual situation the free ends of the bridging element 18 are of sufficient length so that they will remain out of the fish's mouth at one side or the other. When the fish has been captured and it is desired to remove the hook, it is merely necessary to pull on the free ends of the bridging element 18. The tightening of the bridging element between the barb 15 and the aperture 17 serves to lift the flesh of the fish above the barb, thus rendering the barb ineffective to prevent retraction of the hook. The tension applied to the bridging element 18 frequently is also effective to reverse the position of the hook, that is, to turn it from the position shown in Fig. 2 to a position somewhat as depicted in Fig. 3. A continued pull on the ends of the bridging element 18 is effective to withdraw the hook from the flesh of the fish.

It will be noted from an inspection of Figs. 3 and 4 that it is not necessary to hold either the leader 12 or the shank of the hook while pulling on the bridging element 18. On the contrary, it is merely necessary to pull upon the ends of the bridging element and the tension applied tends to turn the hook into a position in which it can be readily withdrawn and simultaneously lift the flesh of the fish clear of the barb.

In hooks of this character the shank 10 is preferably made quite short so that the eye 11 therein is very close to being directly opposite the pointed end of the hook. This facilitates the turning of the hook into its withdrawal position and its retraction from the fish's mouth.

In most sizes of hooks the apertures 16 and 17 can be made sufficiently small so that their presence will not materially weaken the hook. However, in very small sized hooks having very slender shanks a guide may be employed in the form of a small bail that is welded or soldered onto the side of the shank. The ends of the bridging element 18 can be slidably extended through such bail. Such a construction may be resorted to to preserve maximum strength throughout the length of the hook.

In Fig. 5 an alternative form of construction is disclosed wherein the limp bridging element 18a, after being extended through the aperture 16a to form a loop, has its ends drawn through the aperture 17a and then tied together, as indicated at 19. The knot at 19 is spaced sufficiently from the shank of the hook to allow the loop to assume the position lying against the bend of the hook as in Fig. 2. This form of construction leaves but a single extended free end of the bridging element trailing from the hook.

It is possible to extend the bridging element upwardly through the aperture 17 or 17a downwardly through the aperture 16 or 16a and tie a knot in the bridging element that will assume a position immediately beneath the barb. Such a construction, however, I do not regard as preferable although it is operable. I prefer a construction wherein a loop is formed by the bridging element extending through the aperture in the barb with the ends of the loop extending at least through the aperture in the bend of the hook. Whether the ends are left free, as in Fig. 1, or are connected together, as in Fig. 5 is largely optional.

Various changes may be made in the details of the construction without departing from the spirit and scope of the invention as defined by the appended claims.

I claim:

1. A fishhook having a barb on the pointed end thereof, guide means on the bend of the hook arranged in alignment with the tip of the barb, and a limp element attached to the barb and guided by the guide means whereby on hooking a fish, the flesh of the fish passing over the barb may press the limp element against the shank of the hook thereadjacent allowing the barb to function to prevent retraction of the pointed end but on pulling the limp element taut the barbed flesh may be lifted thereby over the barb to free the hook and the hook pulled thereby from the fish.

2. A fishhook having a barb on the pointed end thereof, guide means on the bend of the hook arranged in alignment with the tip of the barb, and a limp element attached to the barb and guided by the guide means whereby on hooking a fish, the flesh of the fish passing over the barb may press the limp element against the shank of the hook thereadjacent allowing the barb to function to prevent retraction of the pointed end but on pulling the limp element taut the barbed flesh may be lifted thereby over the barb to free the hook and the hook pulled thereby from the fish, the free end of the limp element being free and detached from its end to the guide means.

3. A fishhook having a barb on the pointed end thereof, there being an aperture in the barb, there being an aperture in the bend of the hook arranged in alignment with the tip of the barb, and a limp bridging element trained through the aperture on the barb and having its ends extended through the aperture in the bend of the hook.

4. A fishhook having a barb on the pointed end thereof, there being an aperture in the barb, there being an aperture in the bend of the hook arranged in alignment with the tip of the barb, and a limp bridging element trained through the aperture on the barb and having its ends extended through the aperture in the shank, the end portions of the limp element being free and detached after being extended through the aperture in the shank.

HARRY NICK GORRIAS.

REFERENCES CITED

The following references are of record in the file of this patent:

UNITED STATES PATENTS

| Number | Name | Date |
| --- | --- | --- |
| 1,333,148 | Anderson | Mar. 9, 1920 |